Dec. 3, 1968   A. H. MÜLLER ET AL   3,414,286
MULTI-WHEEL STEERING SYSTEM FOR MOTOR VEHICLES
Filed March 10, 1966   4 Sheets-Sheet 3

INVENTORS.
ALFRED H. MÜLLER
HELMUT HÖHN

BY *Dicker + Craig*

ATTORNEYS

INVENTORS.
ALFRED H. MÜLLER
HELMUT HÖHN

United States Patent Office 3,414,286
Patented Dec. 3, 1968

3,414,286
MULTI-WHEEL STEERING SYSTEM
FOR MOTOR VEHICLES
Alfred H. Müller, Waiblingen, and Helmut Höhn, Gaggenau, Germany, assignors to Daimler-Benz Aktiengesellschaft, Stuttgart-Unterturkheim, Germany
Filed Mar. 10, 1966, Ser. No. 533,331
Claims priority, application Germany, Mar. 10, 1965,
D 46,736
16 Claims. (Cl. 280—91)

ABSTRACT OF THE DISCLOSURE

A multi-wheel steering system for motor vehicles in which the steering linkages of the steerable axles are connected with each other by a power-transmitting member which is of subdivided construction, whereby one part of the power-transmitting member is coordinated to the front axle or axles, another part to the rear axle or axles, and the parts of the power-transmitting member are connected with each other by at least one disengageable coupling. The coupling includes a rigid housing having two toothed axially fixed disks connected to the two parts of the power-transmitting member, a toothed fixed coupling part, and a single clutch member axially movable to selectively lock the disks together, or lock either one of the disks to the housing.

Background of the invention

With a known multi-wheel steering system of the aforementioned type vehicle, a steering system of the front axle and rear axle is provided for a two-axle vehicle. The steering linkages of the two axles are connected with each other by a power-transmitting device consisting of a subdivided push-and-pull rod, whose parts with the mutually facing ends thereof engage at a shiftable claw clutch. The claw clutch has two shifting positions whereby it either connects the two parts of the push-and-pull rod rigidly with each other—for a multi-wheel steering system, for example, in difficult terrain—or rigidly connects the part of the push-and-pull rod coordinated to the rear axle with the vehicle body and therewith blocks the same—for a drive on a normal road—and thereby permits only a steering of the front axle. In both cases, the steering of the vehicle takes place from a forward driver seat by means of a steering wheel arranged thereat. The driver is therefore in a position only during the forward driving of the vehicle to control the same in a completely satisfactory manner, especially when driving through difficult cross-country terrain. However, a multi-wheel steering system which inherently is already expensive, is utilized frequently with cross-country military vehicles in which a good maneuverability is a prerequisite for successful battle operations. Such a type of vehicle, therefore, has to be capable of being controlled completely satisfactory both while driving through cross-country in the forward as well as in the rearward direction, on the one hand, and while driving over normal roads, on the other. This, however, is not possible with the multi-wheel steering systems of the prior art described hereinabove.

Summary of the invention

The present invention now aims at creating a multi-wheel steering system which completely satisfies all requirements both in civilian usage, for example, as a commercial-type vehicle as well as also for special military purposes.

As solution of the underlying problems, the present invention proposes in connection with the steering systems described hereinabove that one steering gear each with steering wheel or the like is arranged at least at the forward and at the rearward part of the power-transmitting device and that by a corresponding construction and shiftability of the coupling or couplings, each part of the power-transmitting device is adapted to be locked by itself so as to be held immovably.

In order to achieve additionally an appropriate and compact as well as space-saving arrangement of the power-transmitting device, according to a preferred embodiment of the present invention the two parts thereof are arranged in the vehicle longitudinal direction aligned with each other and approximately in the vehicle center. Both a push-and-pull rod as well as also a torsion rod may be used as power-transmitting member according to the present invention whereby the connection of coupling and transmission member or transmission members and the corresponding steering linkages at the axles may take place possibly with the aid of suitable shifting or deflecting means.

However, according to another embodiment of the present invention provision is also made that the parts of the power-transmitting device extending in the vehicle longitudinal direction are mutually offset and engage with the disengageable coupling, arranged transversely to the vehicle longitudinal axis, by way of shifting means. An offset arrangement of the power-transmitting device would, for example, be of advantage with a drive connection extending, for example, along the vehicle center whereby the drive connection can be avoided or by-passed in an appropriate manner by the transmission device of the type described above. However, also with this embodiment it is within the choice of the designer and engineer to construct the power-transmitting device both as push-and-pull rod as also as torsion rod whereby possibly corresponding deflecting or shifting means such as levers or the like have to be used.

A mechanical coupling is provided as disengageable coupling which may be of substantially identical construction for all of the aforementioned embodiments. The coupling according to the present invention is constructed in principle in such a manner that it includes a housing rigidly secured at the vehicle, within which two disk-like coupling parts, each connected with a corresponding part of the power-transmitting device, are rotatably supported adjacent one another and coaxial to one another while engaging parts rigid with the housing are coordinated to the two coupling parts, and that axially displaceable coupling means are coordinated to the coupling parts within the housing which can selectively establish by axial displacement thereof a rigid connection of each individual coupling part with the housing or of the two coupling parts with each other. Such a coupling can be actuated without great expenditure from each driver seat both during the drive as well as during standstill. In that connection, the present invention provides that at each driver seat either an all-wheel steering system may be engaged or the respective oppositely disposed axle or axles can be locked with simultaneous steerability of the axle or axles coordinated to the respective driver seat. Furthermore, it is also possible without difficulty, for example, for reasons of safety to provide additionally a direct shifting of the coupling from outside of the vehicle.

The mechanical coupling described hereinabove may be constructed in principle in the manner of a mechanically actuated friction clutch. According to a preferred embodiment of the present invention, the coupling is, however, so constructed that the coupling parts are constructed identically in the manner of gear wheels or with apertures and that also identical complementary gear rings or apertures are provided in the housing as engaging parts and that a coupling sleeve is arranged on the coupling parts which is constructed in the manner of a shifting sleeve provided with internal teeth or with claws or pin parts. Of course, a locking and/or a connection of the parts of the power-transmitting device should take place only when the corresponding wheels of the vehicle coordinated to the parts of the power-transmitting device are in the straight driving position. In order to avoid a shifting of the coupling in another position of the wheels, the present invention therefore proposes that the aforementioned apertures or teeth at the coupling parts and at the engaging parts in the housing and the internal teeth, claws, or pin parts at the coupling sleeve are of mutually different consrtuction so that to each aperture at the coupling part or housing a certain claw or pin part is coordinated. The same holds true for the toothed coupling parts and shifting sleeve provided with internal teeth. Consequently, the coupling is shiftable only when the mutually coordinated cooperating parts face each other, i.e., with a straight driving position of the wheels.

Another embodiment of a mechanical coupling according to the present invention provides that both coupling parts have differently large diameters and are provided at the circumference with apertures, and that apertures are provided in the housing which correspond to those of the larger coupling part and that as coupling means a ring-like coupling sleeve is arranged concentrically to both coupling parts and is supported on one of the coupling parts, which coupling sleeve is provided in the ring body with axial locking bolts for engagement into the apertures of the larger coupling part and of the housing and along the inner circumference with projections for the engagement into the apertures of the smaller coupling part. What was said hereinabove also applies to the construction of the apertures, locking bolts, and projections to assure a shifting only in a predetermined portion of the wheels.

With both embodiments of a mechanical coupling described above, the two coupling parts may be coaxially arranged in the housing by means of the shafts thereof. However, the present invention proposes as a more advantageous solution, an embodiment in which one coupling part is supported in the other coupling part by means of an axial pin and the shafts of the two coupling parts extend out of the housing in a mirror-image-like manner relative to one another. Such a support of the coupling parts is particularly suited with the application of a power-transmitting device constructed as torsion rod whereby the coupling part shafts extending out of the housing can be flangedly connected directly and in alignment with the adjoining parts of the power-transmitting device. However, also with a power-transmitting device constructed as push-and-pull rod, the coupling part support described hereinabove may be utilized in principle. The coupling has to be arranged in that case, however, transversely to the vehicle longitudinal axis and the connection of the coupling part shafts with the parts of the power-transmitting device, mutually offset in that case, takes place by deflecting or shifting levers.

However, an offset of the parts of the power-transmitting device can be avoided if one of the coupling parts is taken out and—swung around by 180°—is re-assembled in the housing, and more particularly in such a manner that in this case it extends with its shaft through the other coupling part and is supported with its axle stub in the housing. The deflecting or shifting levers may now be secured directly adjacent one another at the corresponding coupling part shafts whereby a nearly aligned arrangement of the parts of the power-transmitting device is assured.

In addition to a mechanical coupling, a coupling actuated by a pressure medium may also be provided according to the present invention. In the case that a form-locking connection of the coupling parts is contemplated therewith, the present invention proposes that the disengageable coupling includes a housing rigidly secured at the vehicle and that two plunger-piston-like coupling parts, one each connected with a corresponding part of the power-transmitting device, are arranged in a continuous cylindrical aperture of the housing coaxially to each other and in overlapping relationship and that, on the one hand, locking means are provided between each individual one of the two coupling parts and the housing and, on the other mutual connecting means are provided between the two coupling parts with both the locking and connecting means to be actuated by a pressure medium.

The construction of a pressure medium actuated coupling as described above is again well-suited for an aligned arrangement of the power-transmitting device which, in this case, has to be constructed, however, as push-and-pull rod. The parts of the power-transmitting device may then—with an arrangement of the coupling in the vehicle longitudinal direction—be secured directly at the corresponding coupling parts projecting out of the housing. However, also an offset arrangement of the power-transmitting device now constructed as subdivided torsion rod is made possible by the pressure medium actuated coupling according to the present invention whereby the coupling is arranged transversely to the vehicle longitudinal direction and the connection of the coupling parts with the corresponding parts of the power-transmitting device takes place by way of shifting or deflection levers.

The actuation of the connecting and locking means by a pressure medium may take place in principle in any suitable manner, for example, by diaphragms or the like. The present invention, however, provides preferably that the coupling parts form at the same time pressure cylinders and that for the actuation of the locking and connecting means one actuating piston each is arranged within the two coupling parts which is actuated by a pressure medium and is axially displaceable against a spring force.

Since the actuating pistons are to be displaced independently of one another, there is coordinated according to the present invention to each coupling part a pressure medium connection and a helical compression spring which is supported, on the one hand, against a collar at the coordinated actuating piston and on the other, against a collar provided along the inner walls of the coupling part.

The locking and connecting means actuated by means of the actuating pistons may be constructed in principle in any known manner, for example, in the manner of a locking bolt mechanism. However, in one preferred embodiment the present invention proposes that ball detents serve as locking and connecting means and that the locking balls arranged in bores of each coupling part are forced radially outwardly into annular grooves provided in the housing by means of an inclined surface provided at the actuating piston upon application of pressure on the respective piston so that the balls lock the two parts with respect to each other, and that the connecting balls disposed in an annular groove provided in the outer coupling parts as well as in radial bores provided in the inner coupling part of the coupling parts to be connected with each other are released for escaping or falling back in the inward direction upon application of pressure on one of the actuating pistons.

After removal of the pressure in the pressure line, there takes place then the return of the actuating piston by the compression spring and therewith a disengagement of the coupling part locking means and the connection of the coupling parts with each other.

Of course, also with this construction one has to make sure of such a coordination of the radial bores to the annular grooves that a connection of the two coupling parts, i.e., the shifting of the coupling to an all-wheel steering as well as the locking of one of the coupling parts, i.e., the locking of one of the axles, takes place only with the corresponding vehicle wheels in the straight driving position. As to the rest, the coupling is to be capable of being shifted both during the drive as well as during standstill. However, it is not necessary to wait for a straight driving position of the wheels as the moment for the control of the pressure line, i.e., for the actuation of the coupling; for the coupling then shifts automatically into the preselected position, for example, preselected by means of a switch at the corresponding pressure line when the corresponding radial bore and annular groove face one another.

Of course, it is also feasible within the scope of the present invention to actuate the locking means by the compression spring and the connecting means by the pressure medium. However, the construction according to the present invention as described above offers the advantage in contrast thereto, that with a sudden drop or elimination of the line pressure, for example, with a pressure line defect or failure, a connection of the coupling parts takes place automatically; that is, the coupling is shifted to all-wheel steering. For the actuation of the locking and connecting means described above, the present invention proposes that a central pin provided with a collar coordinated to the connecting means is arranged at one actuating piston facing the other actuating piston, against which collar abut externally the locking members which are disposed at the ends of spring tongues that extend from the other actuating piston.

Appropriately, the collar at the central pin passes over by means of conical surfaces mutually arranged in a mirror-image-like manner into the pin itself and/or the inner surfaces of the control members abutting thereagainst are conically constructed in a similar manner.

Insofar as the construction of the annular grooves is concerned, it should be mentioned that the depth therof in every case has to be kept smaller than the corresponding ball radius. As to the rest, they may be of different types of construction as regards the cross section thereof, for example, of circular segmental shape, oval, or the like. However, according to one preferred embodiment, the present invention proposes that the annular grooves serving for the accommodation of the locking and connecting balls have a trapezoidally shaped cross section. The advantage of this construction of the annular grooves essentially resides in the fact that with a uniform displacement of the coupling parts, the balls are pressed radially inwardly with uniform radial force by the inclined surfaces of the trapezoid whereas, for example, with a circular, segmentally shaped annular groove cross section, the balls, after an initial constraining action, are thrust inwardly in an explosion-like manner.

Such a control of the pressure medium is appropriate with the construction of the pressure medium actuated coupling in accordance with the present invention as described hereinabove that exclusively selectively each pressure line is under pressure only individually. Advantageously, the control of the pressure line will be realized in such a manner that, for example, the valve for the pressure line for the locking of the rear axle can be actuated only from the front driver seat and vice versa, the pressure line for the locking of the front axle can be controlled only from the rear driver seat.

Accordingly, it is an object of the present invention to provide a multi-wheel steering system for motor vehicles which eliminates by simple means the aforementioned drawbacks and shortcomings encountered with the prior art constructions.

Another object of the present invention resides in a multi-wheel steering system for motor vehicles which can be driven completely satisfactorily from the front or the rear of the vehicle and which is suitable not only for normal road driving and but also for cross-country driving.

A further object of the present invention resides in a multiwheel steering system for motor vehicles which can be readily utilized normally as a conventional commercial-type vehicle but is capable of being used in special applications as a cross-country-type military vehicle.

Still another object of the present invention resides in a multiwheel steering system for motor vehicles which permits the steering of the vehicle both during normal road driving and cross-country driving regardless of whether the vehicle drives in the forward direction or in the reverse direction.

A further object of the present invention resides in a selectively engageable and disengageable coupling for use with a multi-wheel steering system of the type described above which is simple in construction, and reliable in operation, and which requires relatively little space.

Still another object of the present invention resides in a disengageable coupling for a multi-wheel steering system of the type described above which permits an appropriate and compact as well as space-saving arrangement of the power-transmitting elements used in transmitting the steering forces of the vehicle.

Another object of the present invention resides in a multi-wheel steering system that can be selectively actuated both during driving and standstill of the vehicle.

A further object of the present invention resides in a selectively engageable coupling for a multi-wheel steering system of the type described above which permits the engagement of the coupling parts only with the wheels in the normal straight driving position.

*Brief description of the drawing*

These and other objects, features, and advantages of the present invention will become more obvious from the following description when taken in connection with the accompanying drawing which shows, for purposes of illustration only, several embodiments in accordance with the present invention, and wherein.

*Detailed description of the drawing*

Figure 1:
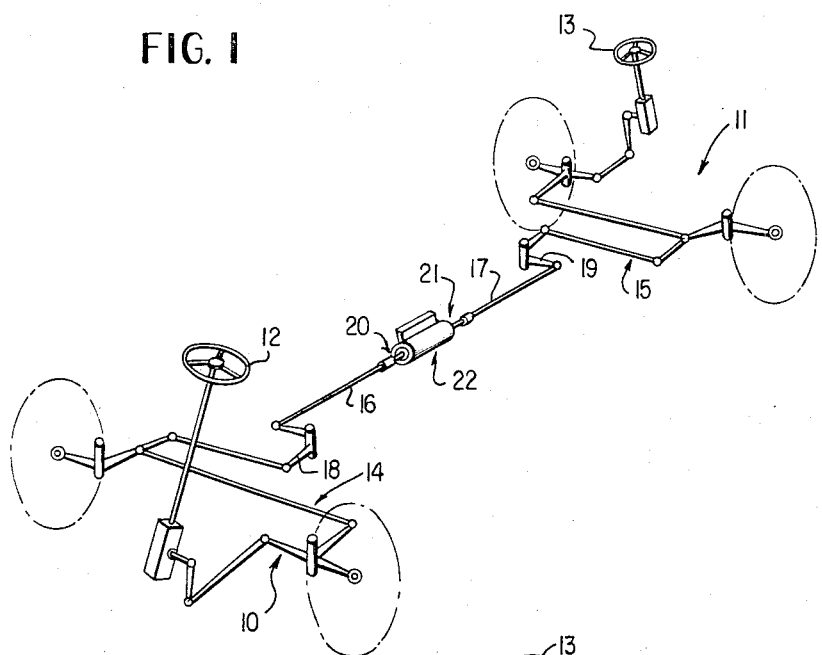
FIGURES 1 to 4 are schematic perspective views of four embodiments of a multi-wheel steering system provided with four different arrangements and constructions of a disengageable coupling and of the power-transmitting device in accordance with the present invention.

Referring now to the drawing wherein like reference numerals are used throughout the various views to designate like parts, and more particularly to FIGURE 1, this figure illustrates a multi-wheel steering system provided with one steerable front axle generally designated by reference numeral 10 and one rear axle generally designated by reference numeral 11 each. The steering of these axles 10, 11, can take place either from the front driver seat by means of a steering wheel 12 or from a rear driver seat by means of a steering wheel 13. The steering linkages generally designated by reference numerals 14 and 15 are coupled with each other by a power-transmitting member which is constituted in the illustrated embodiment by a push-and-pull rod consisting of the two parts 16 and 17. For this purpose the parts 16 and 17 are pivotally connected, on the one hand, with a corresponding bell crank 18 and 19, in turn, pivotally connected with the steering linkages 14 and 15, whereas on the other hand, the parts 16 and 17 are secured at the coupling parts generally designated by reference numerals 20 and 21 of a disengageable coupling adapted to be actuated by a pressure medium and generally designated by reference numeral 22 which serves as connecting element for the two parts 16 and 17 of the power-transmitting member. As can be readily seen from FIGURE 1, the parts 16 and 17 of the power-transmitting device together with the pressure-medium-actuated coupling 22 are all in alignment whereby this arrangement exhibits the advantages of economy in space and weight.

Figure 2:
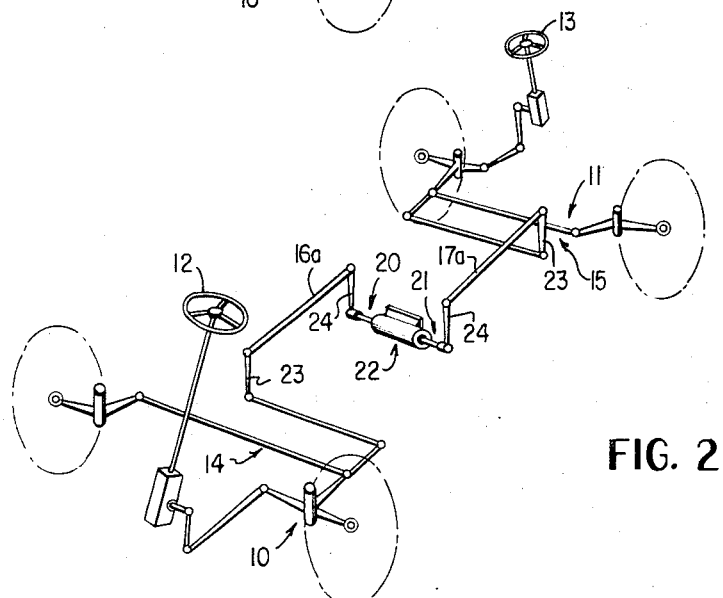

In the embodiment according to FIGURE 2, a torsion rod consisting of two parts 16a and 17a is utilized as power-transmitting device which are pivotally connected with the steering linkages 14 and 15 by way of deflecting or shifting levers 23 rigidly secured to the respective torsion rod parts 16a and 17a and with the coupling parts 20 and 21 by way of shifting or deflecting levers 24 also rigidly secured to the torsion rod parts 16a and 17a. The use of a torsion rod as power-transmitting member requires, on the one hand, an arrangement of the coupling 22 transverse to the vehicle longitudinal direction and, on the other, a mutual lateral offset of the torsion rod parts 16a and 17a with respect to each other whereby the possibility exists to avoid or by-pass advantageously important constructional elements, for example, a continuous drive connection.

Figure 3:
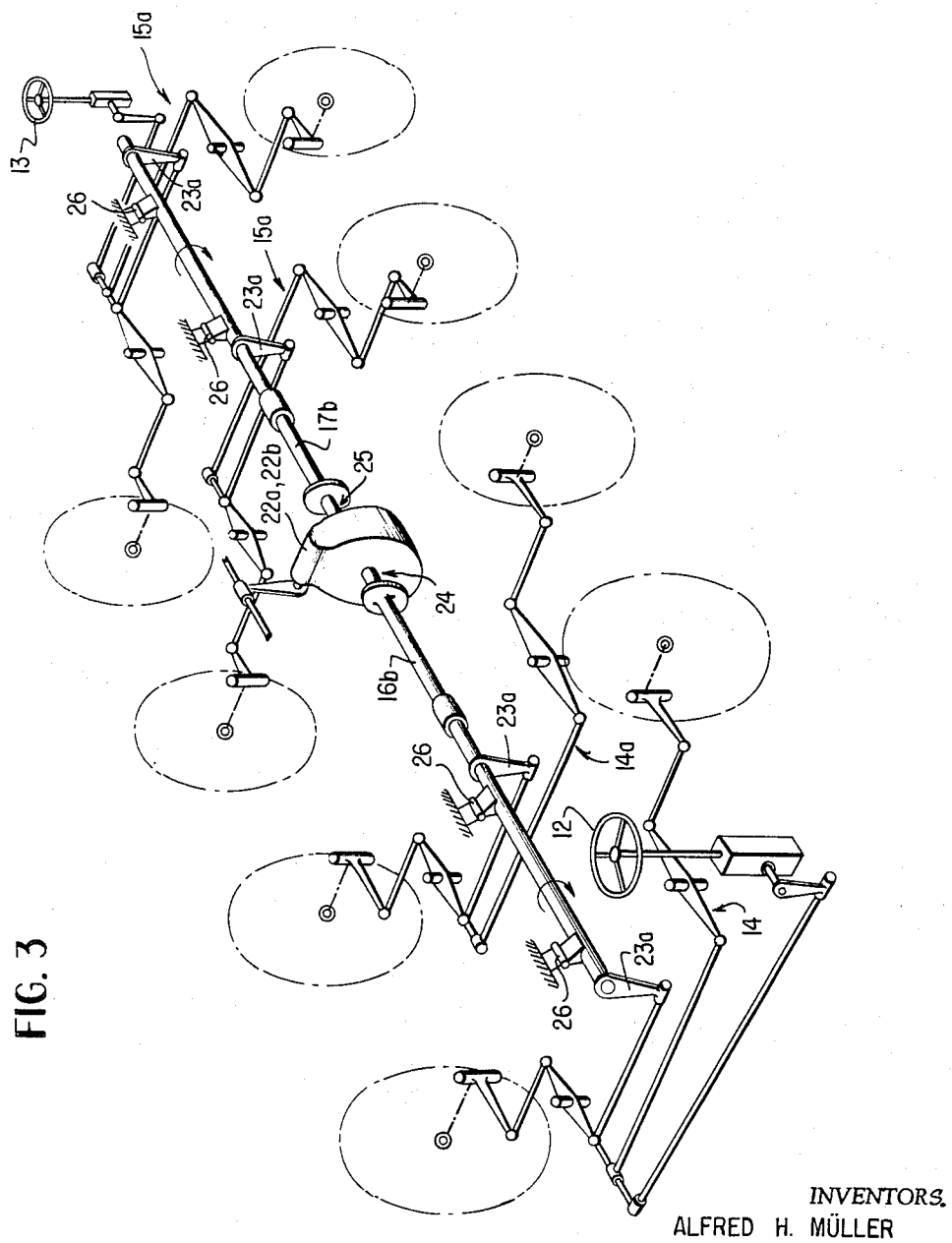

The embodiment according to FIGURE 3 represents a multi-wheel steering system for four steerable axles, i.e., two front and two rear axles. A torsion rod consisting of two parts 16b and 17b serves as power-transmitting member whereby the power-transmission to the steering linkages 14, 14a and 15, 15a takes place by means of deflecting or shifting levers 23a. The axially aligned parts 16b and 17b of the power-transmitting member are flangedly connected with the coupling parts generally designed by reference numerals 24 and 25 of a mechanically actuatable disengageable coupling 22a or 22b. The support of the power-transmitting member at the vehicle body takes place by means of conventional bearings 26.

Figure 4:
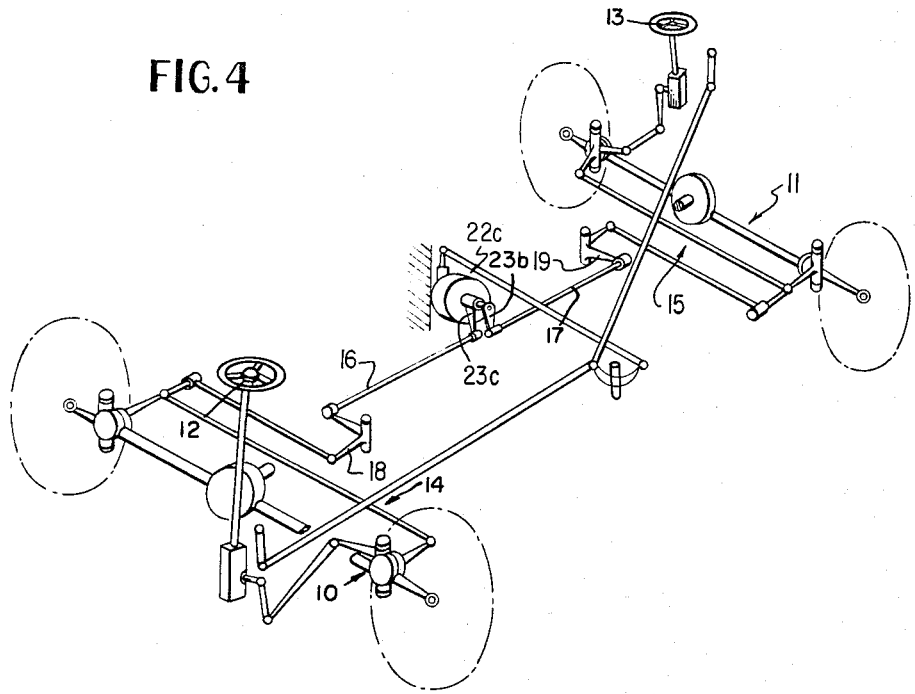

The construction according to FIGURE 4 corresponds to that of FIGURE 1 with the difference that a mechanically actuated disengageable coupling 22c serves in this embodiment as connecting element for the two parts 16 and 17 of the power-transmitting member constructed as push-and-pull rod, which coupling 22c is arranged transversely to the vehicle longitudinal direction, and whereby the parts 16 and 17 of the power-transmitting member are pivotally connected with the coupling parts 24 and 25 by way of deflecting or shifting levers 23b and 23c.

Figure 5:
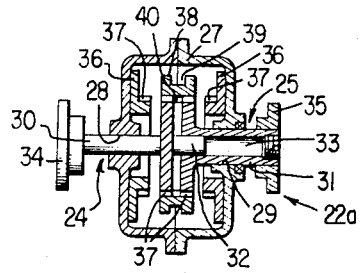
FIGURES 5 to 7 are longitudinal axial cross-sectional views through three embodiments of mechanically actuated disengageable couplings in accordance with the present invention.

One embodiment of the aforementioned mechanically actuated disengageable coupling 22a is illustrated in FIGURE 5. Within a subdivided housing 27 rigidly secured at the vehicle, two disk-shaped coupling parts generally designated by reference numerals 24 and 25 are rotatably but axially non-displaceably supported in coaxial relationship within bores 28 and 29, respectively, by means of the shafts 30 and 31 thereof. For purposes of centering, the coupling part 24 is supported with a shaft pin or stub 32 thereof in a bore 33 of the coupling part 25. The connection of the coupling parts 24 and 25 with the parts 16b and 17b of the power-transmitting device according to FIGURE 3 takes place by means of flanges 34 and 35. Two engaging parts 36 corresponding in the diameters thereof to the coupling parts 24 and 25 are rigidly secured in the housing 27. Coupling parts 24 and 25 as well as engaging parts 36 are provided in the same manner along the circumference with apertures 37 which are of different construction on one and the same part. The connection of the two coupling parts 24 and 25 with each other and the locking of one coupling part 24 or 25, i.e., the connection thereof with an engaging part 36 takes place by means of a bushing-like shifting sleeve 38 actuated from a conventional shifting fork (not illustrated). The shifting fork thereby engages into an annular groove 39 at the shifting sleeve 38.

Locking bolts 40 are arranged along the cylindrical inner walls of the shifting sleeve 38 in the manner of internal teeth which are constructed differently from each other and are coordinated to the apertures 37 at the coupling parts 24, 25 and the engaging parts 36. By axial displacement of the shifting sleeve 38 by means of the shifting fork (not illustrated) the locking bolts 40 then engage into the corresponding apertures 37 and the aforementioned locking of one or connection of both coupling parts 24 and 25 takes place as a result thereof.

By reason of the differing construction of the apertures 37 and of the coordinated locking bolts 40, the coupling is adapted to be shifted only in one position; namely, when the mutually coordinated apertures 37 and locking bolts 40 face each other. Appropriately, the coupling and power-transmitting system are matched to each other in such a manner that the coupling is in its shifting position when the vehicle wheels are in the straight driving position.

Figure 6:
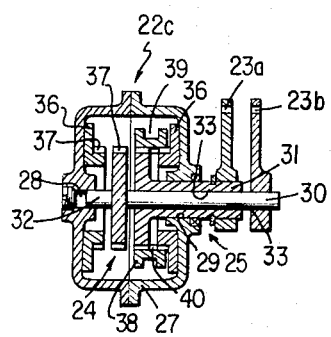

The embodiment of a mechanically actuated coupling 22c according to FIGURE 6 differs from the embodiment according to FIGURE 5 only by a different type of arrangement of the coupling part 24 which, in this case, is supported by means of the shaft pin 32 within the housing 27 and axially extends through the coupling part 25 with the shaft 30 thereof. The connection of the coupling parts 24 and 25 with the parts 16 and 17 of the power-transmitting device takes place according to FIGURE 4 by means of shifting or deflecting levers 23a and 23b.

Figure 7:
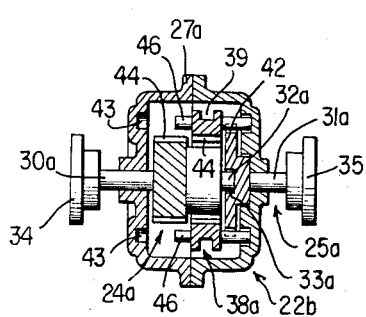

Another construction of a mechanically actuated disengageable coupling 22b is illustrated in FIGURE 7. Disk-shaped coupling parts 24a and 25a are coaxially rotatably supported by means of shafts 30a and 31a within a housing 27a. The centering of the coupling parts 24a and 25a takes place by means of a shaft pin 32a of the coupling part 24a which is supported in an aperture 33a of the coupling part 25a. The diameter of the coupling part 25a is larger than that of the coupling part 24a. The former is provided along the circumference with semi-circularly shaped apertures 42 whereas the circumference of the coupling part 24 is of toothed construction.

A ring-shaped shifting sleeve 38a is supported on a non-toothed section of the coupling part 24a. The shifting sleeve 38a effects the connection of the two coupling parts 24a and 25a with each other or of one of the two coupling parts with the housing 27a which, for this purpose, is provided with apertures 43 and 43a. The ring-shaped shifting sleeve 38 is provided along the inner circumference with teeth 44 which correspond to those of the coupling 24a. Locking bolts 46 are secured in the ring-shaped body 45, which extend axially through the same, for the engagement in the apertures 42 at the coupling part 25a and the apertures 43 and 43a in the housing 27a. The shifting of the shifting sleeve 38a again takes place by means of a shifting fork (not shown). The connection of the coupling parts 24a and 25a with the parts 16b and 17b of the power-transmitting device takes place by means of flanges 34 and 35.

During locking of the coupling part 25a, the shifting sleeve 38a is in the position thereof illustrated in FIGURE 7, i.e., the locking bolts 46 engage in the apertures 42 at the coupling part 25a and in the apertures 43 of the housing 27a. For purposes of locking, the coupling part 24a, the shifting sleeve 38a is displaced toward the left into the end position. The teeth 44 at the coupling part 24a and at the shifting sleeve 38a then engage with each other whereas the locking bolts 46 engage into the apertures 43 at the housing 27a. The connection of the two coupling parts 24a and 25a with each other takes place in the center position of the shifting sleeve 38a, on the one hand, by engagement of the teeth 44 at the coupling part 24a and the shifting sleeve 38a and, on the other, by engagement of the locking bolts 46 in the apertures 42 at the coupling part 25a.

Of course, also with this embodiment of a mechanically actuated coupling, the teeth 44 as well as the apertures 42, 43 and 43a as well as the locking bolts 46 must be matched to each other in such a manner that a shifting of the coupling can take place only in a straight driving position of the vehicle wheels.

Figure 8:
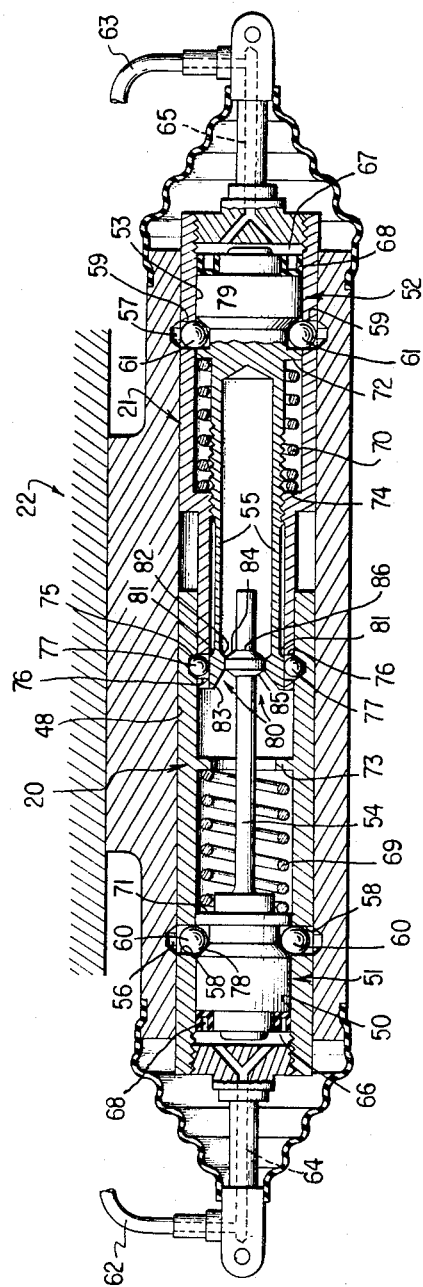
FIGURE 8 is a longitudinal axial cross-sectional view through a disengageable coupling in accordance with the present invention which is adapted to be actuated by a pressure medium.

One embodiment of a pressure-medium-actuated coupling 22 as used in FIGURES 1 and 2 is illustrated in longitudinal axial cross section in FIGURE 8. A housing 47 rigidly secured at the vehicle is provided with a cylindrical bore 48 within which are axially displaceably supported two plunger-piston-like coupling parts 20 and 21 in such a manner that the coupling part 21 together with its hollow pin portion 49 extends into a central aperture 50 of the coupling part 20. The coupling parts 20 and 21 are provided with corresponding eyes or lugs or connecting means for the connection with the parts 16 and 17 of the power-transmitting member constructed as push-and-pull rod for the connection with the parts 16a and 17a of the power-transmitting member constructed as torsion rod by way of shifting or deflecting levers.

Within the coupling parts 20 and 21, one actuating piston generally designated by reference numeral 51 and 52 is axially moveably arranged in a respective aperture 50 and 53 thereof. The actuating piston 51 engages with a pin-shaped extension 54 between two or more tongue-like extensions 55 of the actuating piston 52. The actuating pistons 51 and 52 serve for the actuation of a locking mechanism which fixes the individual coupling parts at the housing 47 as well as for the actuation of means for connecting the individual coupling parts with each other.

For purposes of locking the coupling parts 20 and 21, there is machined into the housing 47 an annular groove 56 and 57 each of trapezoidal cross section and the coupling parts 20 and 21 are provided with radial bores 56 and 57, within which are arranged locking balls 60 and 61, respectively.

The movement or displacement of the actuating pistons in a direction against one another takes place in this embodiment by a pressure medium which is supplied through pressure lines 62 and 63 connected to the coupling parts 20 and 21 and by way of bores 64 and 65 to the pressure space 66 and 67, respectively, which pressure spaces are sealed with respect to the bores 50 and 53, respectively, by means of gaskets 68. The return of the actuating pistons 51 and 52 is effected by helical compression springs 69 and 70 which are supported, on the one hand, against collars 71 and 72 at the actuating pistons 51 and 52 and, on the other, against collars 73 and 74 provided at the inner walls of the coupling part 20 and 21, respectively. An annular groove 75 of trapezoidal cross section is arranged in the bore 50 of the coupling part 20 for the connection of the two coupling parts 20 and 21 with each other. Radial bores 76 are machined into the hollow pin portion 49 for the coupling part 21 in which are arranged connecting balls 77.

When both pressure lines 62 and 63 are relieved, i.e., are without pressure, then the corresponding actuating pistons 51 and 52 are retained in the illustrated positions thereof by the coordinated compression springs 69 and 70. The connecting balls 77 are thereby disposed about one half in the bores 76 and about one half in the grooves 75, i.e., both coupling parts 20 and 21 are connected with each other.

Upon movement of the actuating piston 52 by the pressure medium, the locking balls 61 are forced into the radial bores 59 and into the annular groove 57 by means of the inclined surfaces 79 at the actuating piston 52. Simultaneously therewith, the radial bores 76 are now freed or opened up which were previously closed by the locking members 80 located at the ends of the tongue-like extension 55 which now slide off the collar 86 of the pin 54, and the connecting balls 77 escape or fall back in the radially inward direction. As a result thereof, the coupling part 21 is locked, whereas the other coupling part 20 is axially displaceable within the housing 47. The locking of the coupling part 20 takes place in an analogous manner by application of pressure on the piston 51.

Upon relieving the pressure line 62 or 63 the return of the corresponding actuating piston 51 or 52 takes place by the respectively coordinated compression spring 69 or 70. At the same time the connecting balls 77 are again pressed into the radial bores 76 and the annular groove 75 by the cooperation of the inclined surfaces 81, 82 and 83 at the locking members 80 with the inclined surfaces 84 and 85 on the collar 86, at the pin-shaped extension 54. Simultaneously therewith, the respective actuating piston 51 or 52 releases the locking mechanism and the two coupling parts 20 and 21, which are again coupled to each other, are axially displaceable in unison within the housing 47.

The latter case occurs with a common steering of all steerable axles whereas with a steering of the individual axles, the coupling part connected with the remaining axles has to be locked. The coordination of the radial bores to the annular grooves in the locking as well as connecting mechanisms, of course, also has to take place in that case in such a manner that the respective shifting operations can take place only with the vehicle wheels in the straight driving position. Additionally, care must be taken that only one pressure line can be under pressure at any time. In case of failure of the pressure line function, for example, as a result of damage of the lines or of the valves, the coupling automatically shifts to all-wheel steering position.

We claim:

1. A multi-wheel steering system for motor vehicles, especially cross-country-type vehicles having a plurality of steerable axle means and steering linkage means for each steerable axle means, comprising: a plurality of steering gear means, each being drivingly connected with a respective steering linkage means, said steering gear means each having a steering wheel; power-transmitting means operatively connecting said steerable linkage means with each other, said power-transmitting means being of subdivided construction with one power-transmitting part being operatively associated with the more forwardly disposed axle means and the other power-transmitting part with the rearwardly disposed axle means, said power-transmitting means including a mechanically actuated positive engagement clutch; said clutch comprising a housing rigidly secured at the vehicle, two axially fixed disk-like coupling parts drivingly connected with a respective one of said power-transmitting parts and coaxially rotatably supported in said housing adjacent one another, engaging parts stationarily fixed to and within said housing respectfully adjacent said coupling parts, a single clutch member mounted for axial movement between a first position locking only one of said coupling parts to a corresponding one of said engaging parts for front axle steering, a second position locking only the other of said coupling parts to a corresponding one of said engaging parts for rear axle steering and a third position only locking said two coupling parts together for simultaneous front and rear axle steering; two manually controlled clutch actuating means for independently axially shifting said clutch member between said three positions; one of said actuating means having a manual control closely adjacent to one of said steering wheels and the other of said actuating means having a manual control closely adjacent to the other of said steering wheels.

2. The device of claim 1, wherein said power-transmitting parts have their longitudinal axes aligned with respect to each other and the longitudinal direction of the vehicle.

3. The device of claim 1, wherein said power-transmitting parts have their longitudinal axes offset with respect to each other and extending in the longitudinal direction of the vehicle.

4. The device of claim 3, wherein said coupling parts are substantially identical and have radially extending teeth on their outer periphery, said engaging parts are substantially identical and have radially extending teeth on their outer periphery, and said clutch member is an internally toothed sleeve telescopically mounted with respect to said coupling parts and said engaging parts.

5. The device of claim 4, wherein said clutch includes a hollow shaft journaled in said housing and being rigidly connected with one of said coupling parts, a second shaft telescopically journaled within said hollow shaft and journaled within said housing, said second shaft being rigidly secured to the other of said coupling parts, and lever means extending through said housing for shifting said sleeve.

6. The device of claim 5, including crank arms secured, respectively, to said power-transmitting parts and respectively to said hollow and second shafts, and said crank arms being connected to said shafts on the same side of said housing.

7. The device of claim 1, wherein said coupling parts are substantially identical and have radially extending teeth on their outer periphery, said engaging parts are substantially identical and have radially extending teeth on their outer periphery, and said clutch member is an internally toothed sleeve telescopically mounted with respect to said coupling parts and said engaging parts.

8. The device of claim 7, wherein said clutch includes a hollow shaft journaled in said housing and being rigidly connected with one of said coupling parts, a second shaft telescopically journaled within said hollow shaft and journaled within said housing, said second shaft being rigidly secured to the other of said coupling parts, and lever means extending through said housing for shifting said sleeve.

9. The device of claim 8, including crank arms secured, respectively, to said power-transmitting parts and respectively to said hollow and second shafts, and said crank arms being connected to said shafts on the same side of said housing.

10. The device of claim 2, wherein said coupling parts are substantially identical and have radially extending teeth on their outer periphery, said engaging parts are substantially identical and have radially extending teeth on their outer periphery, and said clutch member is an internally toothed sleeve telescopically mounted with respect to said coupling parts and said engaging parts.

11. The device of claim 10, wherein said clutch includes a hollow shaft journaled in said housing and being rigidly connected with one of said coupling parts, a second shaft telescopically journaled within said hollow shaft and journaled within said housing, said second shaft being rigidly secured to the other of said coupling parts, and lever means extending through said housing for shifting said sleeve.

12. The device of claim 11, wherein said shafts extend out of diametrically opposite sides of said housing and are respectively rigidly secured for rotation with said power-transmitting parts.

13. The device of claim 2, wherein one of said coupling parts and said clutch member have interengaging radially extending teeth, said engaging parts being substantially identical and constituting axially extending apertures within said housing, said clutch member having axially extending projections telescopically engaging with said engaging part apertures in said first and second positions, said other coupling part having an axially extending aperture engaging at least one of said clutch member projections.

14. The device of claim 13, wherein said clutch includes a shaft extending through and rotatably journaled in said housing and rigidly carrying one of said coupling parts, a second shaft extending through and rotatably journaled in said housing and rigidly carrying the other of said coupling parts, said shafts being telescopically interconnected at their inner ends and having their outer ends extending through opposite sides of said housing, said shafts being rotatably secured to respective ones of said power-transmitting parts.

15. The device of claim 1, wherein one of said coupling parts and said clutch member have interengaging radially extending teeth, said engaging parts being substantially identical and constituting axially extending apertures within said housing, said clutch member having axially extending projections telescopically engaging with said engaging part apertures in said first and second positions, said other coupling part having an axially extending aperture engaging at least one of said clutch member projections.

16. The device of claim 15, wherein said clutch includes a shaft extending through and rotatably journaled in said housing and rigidly carrying one of said coupling parts, a second shaft extending through and rotatably journaled in said housing and rigidly carrying the other of said coupling parts, said shafts being telescopically interconnected at their inner ends and having their outer ends extending through opposite sides of said housing, said shafts being rotatably secured to respective ones of said power-transmitting parts.

References Cited

UNITED STATES PATENTS

| 1,731,558 | 10/1929 | Wright | 280—91 X |
|---|---|---|---|
| 2,339,205 | 1/1944 | Tapp | 280—91 |
| 2,366,122 | 12/1944 | Merce | 280—91 X |
| 2,791,438 | 5/1957 | Ruf | 280—91 |
| 2,815,853 | 12/1957 | Likens | 180—45 X |
| 2,354,830 | 8/1944 | Reid | 280—91 |
| 2,848,246 | 8/1958 | Ruf | 280—91 |

KENNETH H. BETTS, *Primary Examiner.*